US012476103B2

(12) United States Patent
Hager

(10) Patent No.: US 12,476,103 B2
(45) Date of Patent: Nov. 18, 2025

(54) SIGNAL-TO-NOISE IMPROVEMENT IN FOURIER TRANSFORM QUADRUPOLE MASS SPECTROMETER

(71) Applicant: DH Technologies Development Pte. Ltd., Singapore (SG)

(72) Inventor: James W. Hager, Concord (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 342 days.

(21) Appl. No.: 18/019,497

(22) PCT Filed: Aug. 4, 2021

(86) PCT No.: PCT/IB2021/057151

§ 371 (c)(1),
(2) Date: Feb. 3, 2023

(87) PCT Pub. No.: WO2022/029648

PCT Pub. Date: Feb. 10, 2022

(65) Prior Publication Data

US 2023/0290630 A1 Sep. 14, 2023

Related U.S. Application Data

(60) Provisional application No. 63/061,855, filed on Aug. 6, 2020.

(51) Int. Cl.
*H01J 49/00* (2006.01)
*H01J 49/42* (2006.01)

(52) U.S. Cl.
CPC ........ *H01J 49/426* (2013.01); *H01J 49/4205* (2013.01)

(58) Field of Classification Search
CPC ............... H01J 49/0031; H01J 49/4205; H01J 49/4225; H01J 49/426; H01J 49/427
See application file for complete search history.

(56) References Cited

U.S. PATENT DOCUMENTS 4,736,101 A * 4/1988 Syka .................. H01J 49/0081 250/282
5,420,425 A * 5/1995 Bier ...................... H01J 49/423 250/282

(Continued)

FOREIGN PATENT DOCUMENTS

WO 2018142265 A1 8/2018

OTHER PUBLICATIONS

International Search Report for PCT/IB2021/057151 mailed Nov. 2, 2021.

(Continued)

*Primary Examiner* — Dani Fox
(74) *Attorney, Agent, or Firm* — Potomac Law Group, PLLC; Reza Mollaaghababa; Brian Hairston

(57) ABSTRACT

In one aspect, a method of performing Fourier Transform (FT) mass spectrometry is disclosed, which comprises passing a plurality of ions through an FT mass analyzer comprising a plurality of rods arranged in a multipole configuration, where the plurality of rods include an input port for receiving ions and an output port through which ions can exit the mass analyzer. The method can further include applying at least one RF voltage to at least one of the rods so as to generate an RF field for radial confinement of the ions as they pass through the mass analyzer, and applying a resonant burst of an AC signal to at least one of said rods so as to remove ions having selected m/z ratios, e.g., m/z ratios within a desired range, from the ions introduced into the FT mass analyzer.

18 Claims, 12 Drawing Sheets

(56) References Cited

U.S. PATENT DOCUMENTS

| | | | | |
|---|---|---|---|---|
| 2012/0267526 | A1 | 10/2012 | Green | |
| 2021/0134573 | A1* | 5/2021 | Hager | H01J 49/427 |

OTHER PUBLICATIONS

J Throck Watson et al., "John Wiley & Sons, Ltd Introduction To Mass Spectrometry" In: "Introduction to mass spectrometry: instrumentation, applications, and strategies for data interpretation", Jan. 1, 2007, Wiley, Chichester, pp. 53-172, 96,97, figures 2-27B.

Written Opinion of the International Searching Authority for PCT/IB2021/057151 mailed Nov. 2, 2021.

* cited by examiner

SIGNAL-TO-NOISE IMPROVEMENT IN FOURIER TRANSFORM QUADRUPOLE MASS SPECTROMETER

RELATED APPLICATION

This application is a 35 U.S.C. 371 national stage filing of International Application No. PCT/IB2021/057151, filed on Aug. 4, 2021, which claims priority to U.S. provisional application No. 63/061,855 filed on Aug. 6, 2020, entitled "Signal-To-Noise Improvement In Fourier Transform Quadrupole Mass Spectrometer," which is incorporated herein by reference in its entirety.

BACKGROUND

The present teachings are directed to methods and systems for performing Fourier transform mass spectrometry.

Mass spectroscopy (MS) is an analytical technique for determining the elemental composition of test substances with both quantitative and qualitative applications. MS can be useful for identifying unknown compounds, determining the structure of a particular compound by observing its fragmentation, and quantifying the amount of a particular compound in a sample. Mass spectrometers detect chemical entities as ions such that a conversion of the analytes to charged ions must occur during processing.

In some mass spectrometers, a Fourier transform (FT) mass analyzer can be employed. The ions introduced into the FT mass analyzer can be radially confined within the analyzer, excited and detected by a downstream detector. The extracted ions can exhibit oscillations that can be detected by a downstream ion detector so as to generate a time-varying ion detection signal. A Fourier transform of the time-varying ion detection signal can be obtained and utilized to generate a mass spectrum of the ions.

When acquiring data with an (FT) mass analyzer, e.g., a quadrupole FT mass analyzer, high intensity ion signals, especially at lower m/z ratios, can partially obscure the oscillations associated with higher m/z, lower frequency, ions, and hence degrade the signal-to-noise ratio (SNR) of the respective mass spectrum.

Accordingly, methods and systems are needed for FT mass spectroscopy, which can enhance the SNR of mass spectra obtained using FT mass analyzers.

SUMMARY

In one aspect, a method of performing Fourier Transform (FT) mass spectrometry is disclosed, which comprises passing a plurality of ions through an FT mass analyzer comprising a plurality of rods arranged in a multipole configuration, where the plurality of rods include an input port for receiving ions and an output port through which ions can exit the mass analyzer. The method can further include applying at least one RF voltage to at least one of the rods so as to generate an RF field for radial confinement of the ions as they pass through the multipole rod set, and applying a resonant burst of an AC signal to at least one of the rods so as to remove ions having selected m/z ratios, e.g., m/z ratios within a desired range, from the ions introduced into the FT mass analyzer.

At least a portion of the remaining ions can be radially excited at secular frequencies thereof such that the fringing fields in proximity of the output end of the plurality of rods convert the radial oscillations of at least a portion of the radially excited ions into axial oscillations as the excited ions exit the multipole rod set. At least a portion of the axially oscillating ions exit the multipole rod set to be detected by a downstream detector, which generates a time-varying signal in response to the detection of the ions.

A Fourier transform of the time-varying signal can be obtained so as to generate a frequency-domain signal and the frequency-domain signal can be utilized to generate a mass spectrum associated with the detected ions.

In some embodiments, the RF voltage can have a peak-to-peak amplitude in a range of about 10 volts to about 1000 volts and a frequency in a range of about 50 kHz to about 3 MHz.

In some embodiments, the AC burst signal is configured to remove ions having m/z ratios less than about 200 Th. By way of example, in some embodiments, the AC burst signal can have a frequency in a range of about 50 to about 600 kHz, and the number of oscillations in the AC burst signal can be, for example, in a range of about 2 to about 50. Further, in some embodiments, the AC burst signal can have an amplitude in a range of about 1 volt to about 50 volts.

The excitation of the radial oscillations of the remaining ions can be achieved by applying a voltage pulse across at least one pair of the plurality of rods. By way of example, the voltage pulse can have a duration in a range of about 0.1 microsecond to about 10 microseconds, e.g., 2 microseconds, and an amplitude in a range of about 10 volts to about 60 volts.

In some embodiments, the temporal separation between the AC burst signal and the voltage pulse can be equal to or less than about 50 microseconds, e.g., in a range of about 5 microseconds to about 50 microseconds. In other embodiments, the AC burst signal and the voltage pulse can be applied substantially concurrently to the multipole rod set. In some embodiments, the radial excitation pulse can precede the AC burst signal. In other embodiments, the AC burst signal can precede the radial excitation pulse, and yet in other embodiments, the radial excitation pulse and the AC burst signal can be applied substantially concurrently.

In a related aspect, an FT mass analyzer is disclosed, which comprises a multipole rod set comprising a plurality of rods arranged relative to one another to allow passage of ions therebetween, said multipole rod set comprising an input port for receiving ions and an output port through which ions can exit the multipole rod set, and an RF voltage source for applying an RF voltage to at least of one of the rods for causing radial confinement of the ions as they propagate through the multipole rod set. Further, at least one AC voltage source is provided for applying a resonant burst of AC signal to at least one of the rods so as to remove ions having selected m/z ratios, e.g., m/z ratios within a desired range, from the ions introduced into the FT mass analyzer.

In some embodiments, the AC burst signal can have a frequency in a range of about 50 kHz to about 600 kHz, and the number of oscillations in the AC signal can be, for example, in a range of about 2 to about 50. Further, in some embodiments, the AC signal can exhibit an amplitude in a range of about 5 to about 50 volts.

At least one voltage source applies a voltage pulse across at least two of the rods so as to excite radial oscillations of at least a portion of the remaining ions at secular frequencies thereof such that the fringing fields in proximity of the output port of the multipole rod set convert the radial oscillations of at least a portion of the excited ions into axial oscillations as the excited ions exit the multipole rod set, and a detector disposed downstream of said FT mass analyzer can detect the axially oscillating ions exiting the multipole rod set.

In response to the detection of the axially oscillating ions, the detector can generate a time-varying signal. An analysis module can receive the time-varying signal and apply a Fourier transform thereto to generate a frequency domain signal, which can be utilized to generate a mass spectrum.

The multipole rod set can be implemented using different number of rods. By way of example, in some embodiments, the multipole rod set is implemented as a quadrupole rod set, through in other embodiments other numbers of rods can also be employed.

In some embodiments, the voltage pulse can have a duration in a range of about 100 ns to 10 microseconds, e.g., in a range of about 500 ns to about 5 microseconds, such as in a range of about 1 microsecond to about 3 microseconds The voltage pulse can have an amplitude in a range of about 10 volts to about 60 volts, e.g., 20 volts to about 50 volts.

Further understanding of various aspects of the present teachings can be obtained by reference to the following detailed description in conjunction with the attached drawings, which are described briefly below.

DETAILED DESCRIPTION

The present teachings relate to a method for performing Fourier transform (FT) mass spectrometry and the corresponding Fourier transform mass analyzer that employ a burst of an AC (alternating voltage) to remove ions having selected m/z ratios from a plurality of ions introduced into the FT mass analyzer so as to achieve an improved signal-to-noise (S/N) ratio for the detection of the remaining ions, e.g., ions having larger m/z ratios, thereby improving the quality of the resultant mass spectrum. As discussed in more detail below, an FT mass analyzer according to the present teachings can include a multipole rod set having an inlet port through which ions generated by an upstream ion source can enter the analyzer and an outlet port through which ions can exit the mass analyzer. The FT mass analyzer can include, among other components, an AC voltage source that can apply a resonant burst of an AC signal to at least one of the rods of the multipole rod set so as to remove certain ions, e.g., low m/z ions, in order to improve a resultant mass spectrum, as discussed in more detail below.

Various terms are used herein consistent with their ordinary meanings in the art. The term "radial" is used herein to refer to a direction within a plane perpendicular to the axial dimension of the multipole rod set (e.g., along z-direction in FIG. 2A). The terms "radial excitation" and "radial oscillations" refer, respectively, to excitations and oscillations in a radial direction. The term "about" as used herein to modify a numerical value is intended to denote a variation of at most 5 percent about the numerical value.

Figure 1:
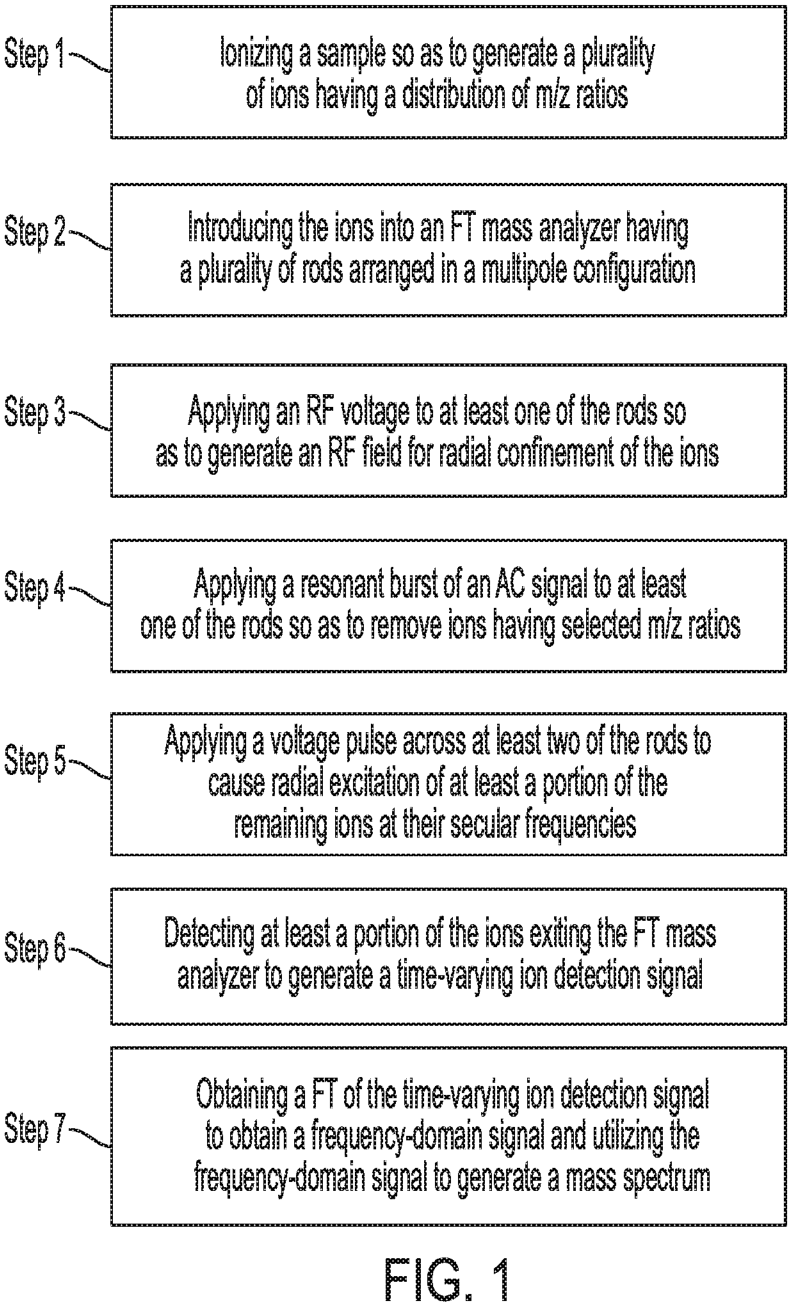
FIG. 1 is a flow chart depicting various steps in a method according to the present teachings for performing FT mass spectrometric measurements of a sample, FIG. 2A schematically depicts a mass analyzer according to an embodiment of the present teachings.

FIG. 1 is a flow chart depicting various steps in an embodiment of a method for performing Fourier transform mass spectrometry, which includes ionizing a sample so as to generate a plurality of ions having a distribution of m/z ratios (step 1). The ions can be introduced into a FT mass analyzer having a plurality of rods that are arranged in a multipole configuration and to provide an inlet port for receiving the ions and an outlet port through which the ions exit the mass analyzer (step 2).

A radio frequency (RF) voltage is applied to at least one of the rods of the multipole rod set so as to generate an RF field for radial confinement of the ions as they pass through the multipole rod set (step 3). A resonant burst of an AC signal is applied to at least one of the rods so as to remove ions having selected m/z ratios, e.g., within a desired range, from the ions introduced into the FT mass analyzer (step 4). The radial oscillations of at least a portion of the remaining ions are excited at the secular frequencies of those ions such that the fringing fields in proximity of the outlet port of the plurality of rods can convert the radial oscillations of at least a portion of the excited ions into axial oscillations as the excited ions exit the multipole rod set (step 5). At least a portion of the axially oscillating ions exiting the multipole rod set is detected so as to generate a time-varying detection signal (step 6). A Fourier transform of the time-varying detection signal is obtained so as to generate a frequency-domain signal and the frequency-domain signal is utilized to generate a mass spectrum associated with the detected ions (step 7).

In some embodiments, the RF voltage can have a peak-to-peak amplitude in a range of about 10 volts to about 300 volts and a frequency in a range of about 50 kHz to about 2 MHz.

In some embodiments, the number of oscillation cycles of the AC signal applied for removing certain ions from the FT mass analyzer can be in a range of about 2 to about 50, and the amplitude of the AC signal can be in a range of about 1 volt to about 50 volts.

As noted above, the excitation of the radial oscillations of the remaining ions can be achieved via application of a voltage pulse applied across at least one pair of the rods. In some embodiments, the voltage pulse can have a duration in a range of about 1 microsecond to about 5 microseconds. In some embodiments, such a voltage pulse can have an amplitude in a range of about 10 volts to about 50 volts.

Figure 2A:
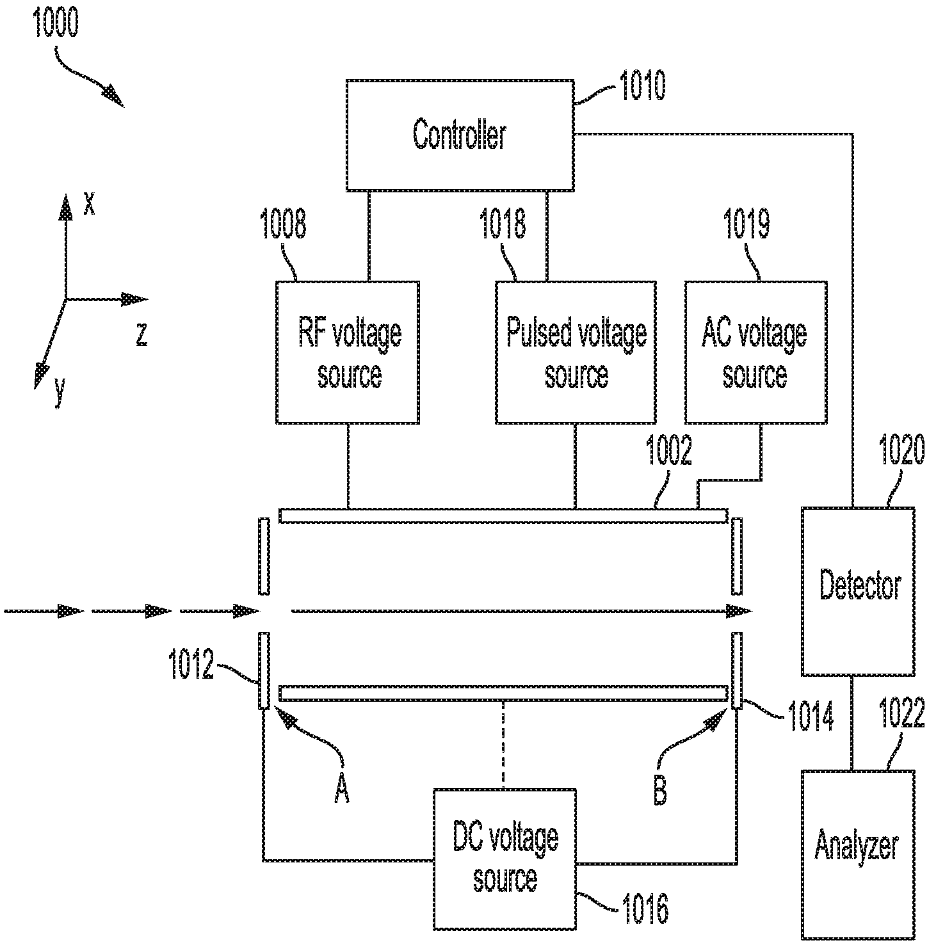
FIG. 2B is a schematic end view of a set of quadrupole rods of the mass analyzer depicted in FIG. 2A, FIG. 3A schematically depicts a square voltage pulse suitable for use in some embodiments of a mass analyzer according to the present teachings, FIG. 3B schematically depicts a short AC signal according to the present teachings, FIG. 4 schematically depicts an example of an analysis module suitable for use in a mass spectrometer according to the present teachings.
Figure 2B:
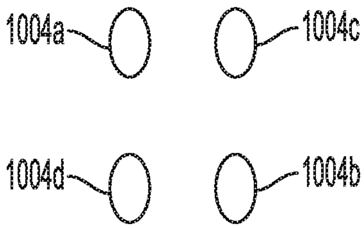

FIGS. 2A and 2B schematically depict a mass analyzer 1000 according to an embodiment of the present teachings, which includes a quadrupole rod set 1002 that extends from an input end (A) (herein also referred to as an inlet port) that is configured for receiving ions to an output end (B) (herein also referred to as outlet port) through which ions can exit the quadrupole rod set. In this embodiment, the quadrupole rod set includes four rods 1004*a*, 1004*b*, 1004*c*, and 1004*d* (herein collectively referred to as quadrupole rods 1004), which are arranged relative to one another to provide a passageway therebetween through which ions received by the quadrupole rod set can propagate from the input end (A) to the output end (B). In this embodiment, the quadrupole rods 1004 have a circular cross-section while in other embodiments they can have a different cross-sectional shape, such as hyperbolic.

The mass analyzer 1000 can receive ions, e.g., a continuous stream of ions, generated by an ion source (not shown in this figure). A variety of different types of ions sources can be employed. Some suitable examples include, without limitation, an electrospray ionization device, a nebulizer assisted electrospray device, a chemical ionization device, a nebulizer assisted atomization device, a matrix-assisted laser desorption/ionization (MALDI) ion source, a photoionization device, a laser ionization device, a thermospray ionization device, an inductively coupled plasma (ICP) ion source, a sonic spray ionization device, a glow discharge ion source, and an electron impact ions source, DESI, among others.

The application of radiofrequency (RF) voltages to the quadrupole rods 1004 can provide a quadrupolar field for radial confinement of ions as they pass through the quadrupole. The RF voltages can be applied to the rods with or without a selectable amount of a resolving DC voltage applied concurrently to one or more of the quadrupole rods.

In some embodiments, the RF voltages applied to the quadrupole rods 1004 can have a frequency in a range of about 50 kHz to about 3 MHz and an amplitude in a range of about 50 volts to about 1000 volts, though other frequencies and amplitudes can also be employed. In this embodiment, an RF voltage source 1008 operating under the control of a controller 1010 provides the required RF voltages to the quadrupole rods 1004.

The quadrupolar field generated via application of RF voltage(s) to the rods can exhibit fringing fields in the vicinity of the outlet port of the quadrupole rod set, which can be utilized to obtain mass selective extraction of ions from the FT mass analyzer, via application of a voltage pulse across at least two of the rods for causing radial ion excitations, as discussed in more detail below.

With continued reference to FIGS. 2A and 2B, in this embodiment, the mass analyzer 1000 further includes an input lens 1012 disposed in proximity of the input end of the quadrupole rod set and an output lens 1014 disposed in proximity of the output end of the quadrupole rod set. A DC voltage source 1016, operating under the control of the controller 1010, can apply two DC voltages, e.g., in range of about 1 to 50 V attractive relative to the DC offset of the quadrupole, to the input lens 1012 and the output lens 1014. In some embodiments, the DC voltage applied to the input lens 1012 causes the generation of an electric field that facilitates the entry of the ions into the mass analyzer. Further, the application of a DC voltage to the output lens 1014 can facilitate the exit of the ions from the quadrupole rod set. The ions pass through the analyzer without being trapped therein.

The lenses 1012 and 1014 can be implemented in a variety of different ways. For example, in some embodiments, the lenses 1012 and 1014 can be in the form of a plate having an opening through which the ions can pass. In other embodiments, at least one (or both) of the lenses 1012 and 1014 can be implemented as a mesh. There can also be RF-only Brubaker lenses at the entrance and exit ends of the quadrupole.

The mass analyzer 1000 further includes an AC voltage source 1019 for application of a resonant burst of an AC burst signal to at least one of the quadrupole rods to cause removal of certain ions from the FT analyzer. In particular, it has been discovered that oscillations associated with certain ions, especially at lower m/z ratios and hence higher frequencies, can at least partially obscure the oscillations associated with ions of interest, e.g., the oscillations associated with ions having higher m/z ratios and hence lower frequencies. As such, removal of certain ions, especially those having lower m/z ratios, can advantageously improve the signal-to-noise ratio (SNR) of a resultant mass spectrum obtained via Fourier transform of a detected oscillatory ion signal. By way of example, in some embodiments, the number of oscillation cycles of the AC burst signal can be in a range of about 2 to about 50 and the amplitude of the AC signal can be in a range of about 1 volt to about 50 volts, e.g., in a range of about 10 volts to about 30 volts. Further, in some embodiments, the frequency of the AC burst signal can be in a range of about 50 kHz to about 600 kHz. As shown in the Examples below, the use of a short AC signal, such as that schematically depicted in FIG. 3B, to remove certain ions from the FT analyzer can reduce the overlap of the oscillatory signals associated with the removed ions and the ions of interest and can hence improve the signal-to-noise ratio of the resultant mass spectrum of the ions of interest, e.g., by a factor in a range of about 2 to about 3.

After or before the application of the AC burst signal, or in some embodiments, substantially concurrent with the application of the AC burst signal, a voltage pulse can be applied across at least two of the quadrupole rods to cause radial oscillations of the remaining ions, which can lead to the mass selective extraction of those ions from the FT mass analyzer. By way of example, the temporal separation of the AC burst signal and the applied voltage pulse can be, for example, less than about 50 microseconds. As noted above, while in some embodiments, the AC burst signal precedes the applied voltage pulse, in other embodiments, the applied voltage pulse can precede the AC burst signal. Yet, in other embodiments, the AC burst signal and the applied voltage pulse can be applied substantially concurrently. As discussed in more detail below, the application of a voltage pulse to at least one of the quadrupole rods can excite the radial oscillations of the ions within the FT mass analyzer. The radially oscillating ions can interact with the fringing fields in the vicinity of the outlet port of the FT mass analyzer such that the radial oscillations are converted into axial oscillations. The axially oscillating ions can exit the FT mass analyzer and can be detected by a downstream detector 1020.

By way of further illustration and without being limited to any particular theory, the application of the RF voltage(s) to the quadrupole rods can result in the generation of a two-dimensional quadrupole potential as defined in the following relation:

$$\varphi_{2D} = \varphi_0 \frac{x^2 - y^2}{r_0^2} \quad \text{Eq. (1)}$$

where, $\varphi_0$ represents the electric potential measured with respect to the ground, and x and y represent the Cartesian coordinates defining a plane perpendicular to the direction of the propagation of the ions (i.e., perpendicular to the z-direction). The electromagnetic field generated by the above potential can be calculated by obtaining a spatial gradient of the potential.

Again without being limited to any particular theory, to a first approximation, the potential associated with the fringing fields in the vicinity of the input and the output ends of the quadrupole may be characterized by the diminution of the two-dimensional quadrupole potential in the vicinity of the input and the output ends of the quadrupole by a function $f(z)$ as indicated below:

$$\varphi_{FF} = \varphi_{2D} f(z) \quad (2)$$

where, $\varphi_{FF}$ denotes the potential associated with the fringing fields and $\varphi_{2D}$ represents the two-dimensional quadrupole potential discussed above. The axial component of the fringing electric field ($E_{z,quad}$) due to the diminution of the two-dimensional quadrupole field can be described as follow:

$$E_{z,quad} = -\varphi_{2D} \frac{\partial f(z)}{\partial z} \quad \text{Eq. (3)}$$

As discussed in more detail below, such a fringing field allows converting radial oscillations of ions excited via application of a voltage pulse to one or more of the quadrupole rods (and/or one or more auxiliary electrodes) to axial oscillations, where the axially oscillating ions are detected by a detector.

With continued reference to FIGS. 2A and 2B, the analyzer 1000 further includes a pulsed voltage source 1018 for applying a pulsed voltage to at least one of the quadrupole rods 1004. In this embodiment, the pulsed voltage source 1018 applies a dipolar pulsed voltage to the rods 1004*a* and 1004*b*, though in other embodiments, the dipolar pulsed voltage can be applied to the rods 1004*c* and 1004*d*.

In some embodiments, the amplitude of the applied pulsed voltage can be, for example, in a range of about 10 volts to about 60 volts, or in a range of about 20 volts to about 30 volts, though other amplitudes can also be used. Further, the duration of the pulsed voltage (pulse width) can be, for example, in a range of about 100 nanoseconds (ns) to about 1 millisecond, e.g., in a range of about 1 microsecond to about 100 microseconds, or in a range of about 5 microseconds to about 50 microseconds, or in a range of about 10 microseconds to about 40 microseconds, though other pulse durations can also be used. In general, a variety of pulse amplitudes and durations can be employed. In many embodiments, the longer is the pulse width, the smaller is the pulse amplitude. Ions passing through the quadrupole are normally exposed to only a single excitation pulse. Once the "slug" of excited ions pass through the quadrupole, an additional excitation pulse is triggered. This normally occurs every 1 to 2 ms, so that about 500 to 1000 data acquisition periods are collected each second.

Figure 3A:
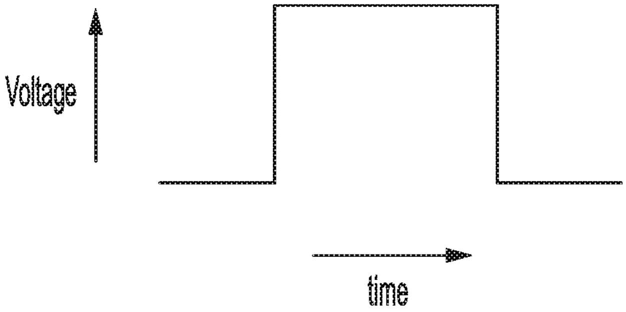
Figure 3B:

The waveform associated with the voltage pulse can have a variety of different shapes with the goal of providing a rapid broadband excitation signal. By way of example, FIG. 3A schematically shows an exemplary voltage pulse having a square temporal shape. In some embodiments, the rise time of the voltage pulse, i.e., the time duration that it takes for the voltage pulse to increase from zero voltage to reach its maximum value, can be, for example, in a range of about 1 to 100 nsec. In other embodiments, the voltage pulse can have a different temporal shape.

Without being limited to any particular theory, the application of the voltage pulse, e.g., across two diagonally opposed quadrupole rods, generates a transient electric field within the quadrupole. The exposure of the ions within the quadrupole to this transient electric field can radially excite at least some of those ions at their secular frequencies. Such excitation can encompass ions having different mass-to-charge (m/z) ratios. In other words, the use of an excitation voltage pulse having a short temporal duration can provide a broadband radial excitation of the ions within the quadrupole.

As the radially excited ions reach the end portion of the quadrupole rod set in the vicinity of the output end (B), they will interact with the exit fringing fields. Again, without being limited to any particular theory, such an interaction can convert the radial oscillations of at least a portion of the excited ions into axial oscillations.

The axially oscillating ions leave the quadrupole rod set and the exit lens 1014 to reach a detector 1020, which operates under the control of the controller 1010. The detector 1020 generates a time-varying ion signal in response to the detection of the axially oscillating ions. A variety of detectors can be employed. Some examples of suitable detectors include, without limitation, are Photonics Channeltron Model 4822C and ETP electron multiplier Model AF610.

An analyzer 1022 (herein also referred to as an analysis module) in communication with the detector 1020 can receive the detected time-varying signal and operate on that signal to generate a mass spectrum associated with the detected ions. More specifically, in this embodiment, the analyzer 1022 can obtain a Fourier transform of the detected time-varying signal to generate a frequency-domain signal. The analyzer can then convert the frequency domain signal into a mass spectrum using the relationships between the Mathieu a- and q-parameters and m/z.

$$a_x = -a_y = \frac{8zU}{\Omega^2 r_0^2 m} \quad \text{Eq. (4)}$$

$$q_x = -q_y = \frac{4zV}{\Omega^2 r_0^2 m} \quad \text{Eq. (5)}$$

where z is the charge on the ion, U is the DC voltage on the rods, V is the RF voltage amplitude, $\Omega$ is the angular frequency of the RF, and $r_0$ is the characteristic dimension of the quadrupole. The radial coordinate r is given by $$r^2 = x^2 + y^2 \quad (6)$$

In addition, when q<~0.4 the parameter β is given by the following relations:

$$\beta^2 = a + \frac{q^2}{2} \quad \text{Eq. (7)}$$

and the fundamental secular frequency is given by $$\omega = \frac{\beta\Omega}{2} \quad \text{Eq. (8)}$$

Under the condition where a=0 and q<~0.4, the secular frequency is related to m/z by the approximate relationship below.

$$\frac{m}{z} \sim \frac{2}{\sqrt{2}} \frac{V}{\omega\Omega r_0^2} \quad \text{Eq. (9)}$$

The exact value of β is a continuing fraction expression in terms of the a- and q-Mathieu parameters. This continuing fraction expression can be found in the reference J. Mass Spectrom. Vol 32, 351-369 (1997), which is herein incorporated by reference in its entirety.

The relationship between m/z and secular frequency can alternatively be determined through fitting a set of frequencies to the equation $$\frac{m}{z} = \frac{A}{\omega} + B \quad \text{Eq. (10)}$$

where, A and B are constants to be determined.

In some embodiments, a mass analyzer according to the present teachings can be employed to generate mass spectra with a resolution that depends on the length of the time varying excited ion signal, but the resolution can be typically in a range of about 10 to about 1000.

Figure 4:
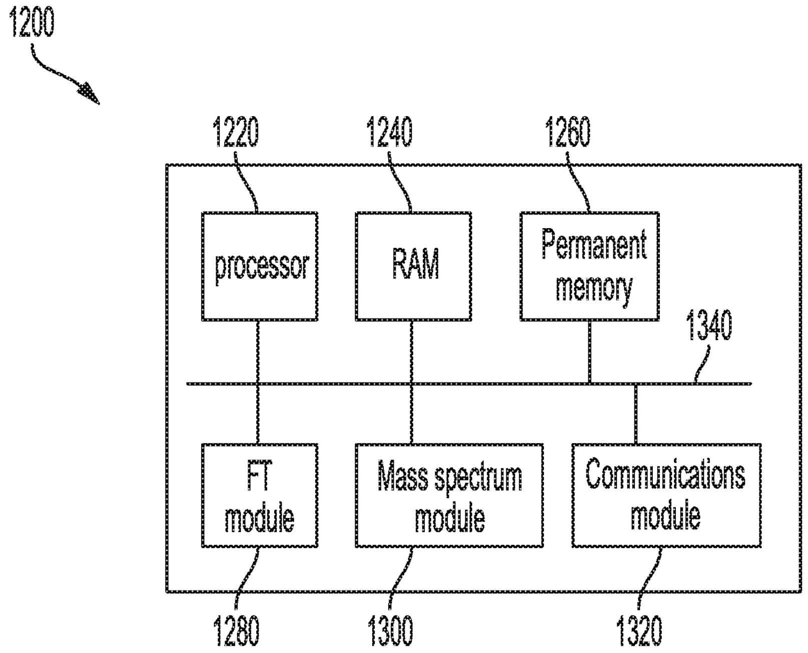

The analyzer 1022 can be implemented in hardware and/or software in a variety of different ways. By way of example, FIG. 4 schematically depicts an embodiment of the analyzer 1200, which includes a processor 1220 for controlling the operation of the analyzer. The exemplary analyzer 1200 further includes a random-access memory (RAM) 1240 and a permanent memory 1260 for storing instructions and data. The analyzer 1200 also includes a Fourier transform (FT) module 1280 for operating on the time-varying ion signal received from the detector 1180 (e.g., via Fourier transform) to generate a frequency domain signal, and a module 1300 for calculating the mass spectrum of the detected ions based on the frequency domain signal. A communications module 1320 allows the analyzer to communicate with the detector 1180, e.g., to receive the detected ion signal. A communications bus 1340 allows various components of the analyzer to communicate with one another.

Figure 5A:
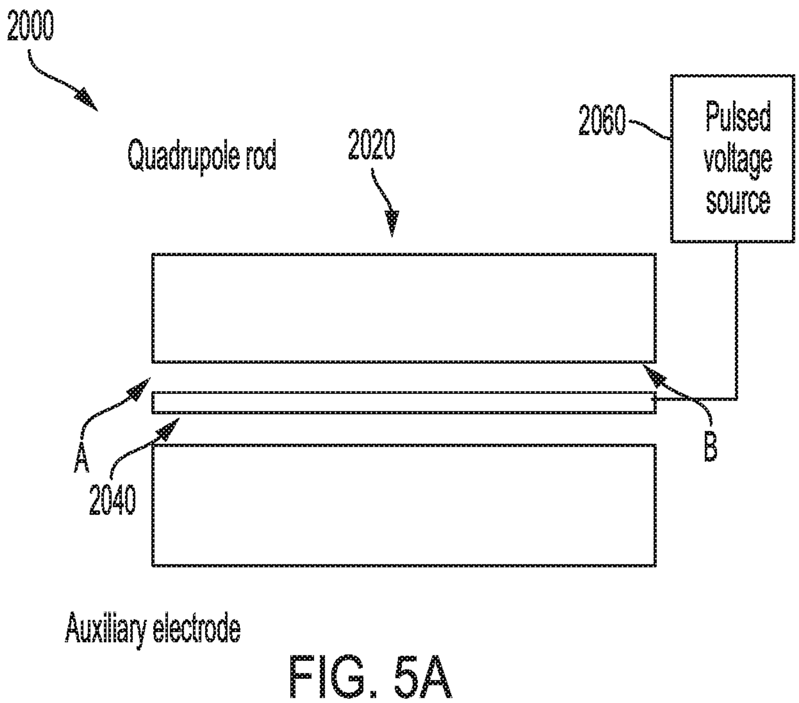
FIG. 5A is a side schematic view of a mass analyzer according to an embodiment, where the analyzer incudes four quadrupole rods and four auxiliary electrodes.
Figure 5B:
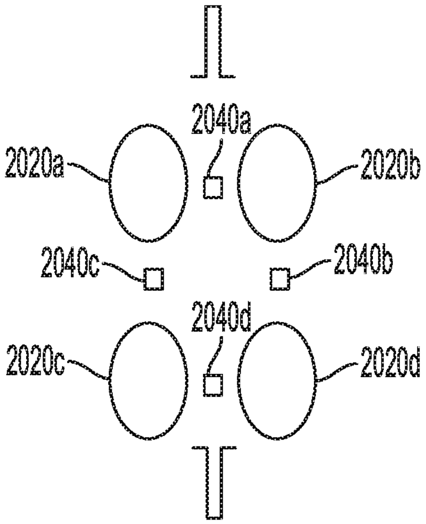
FIG. 5B is an end view of the mass analyzer depicted in FIG. 4A.
Figure 10:
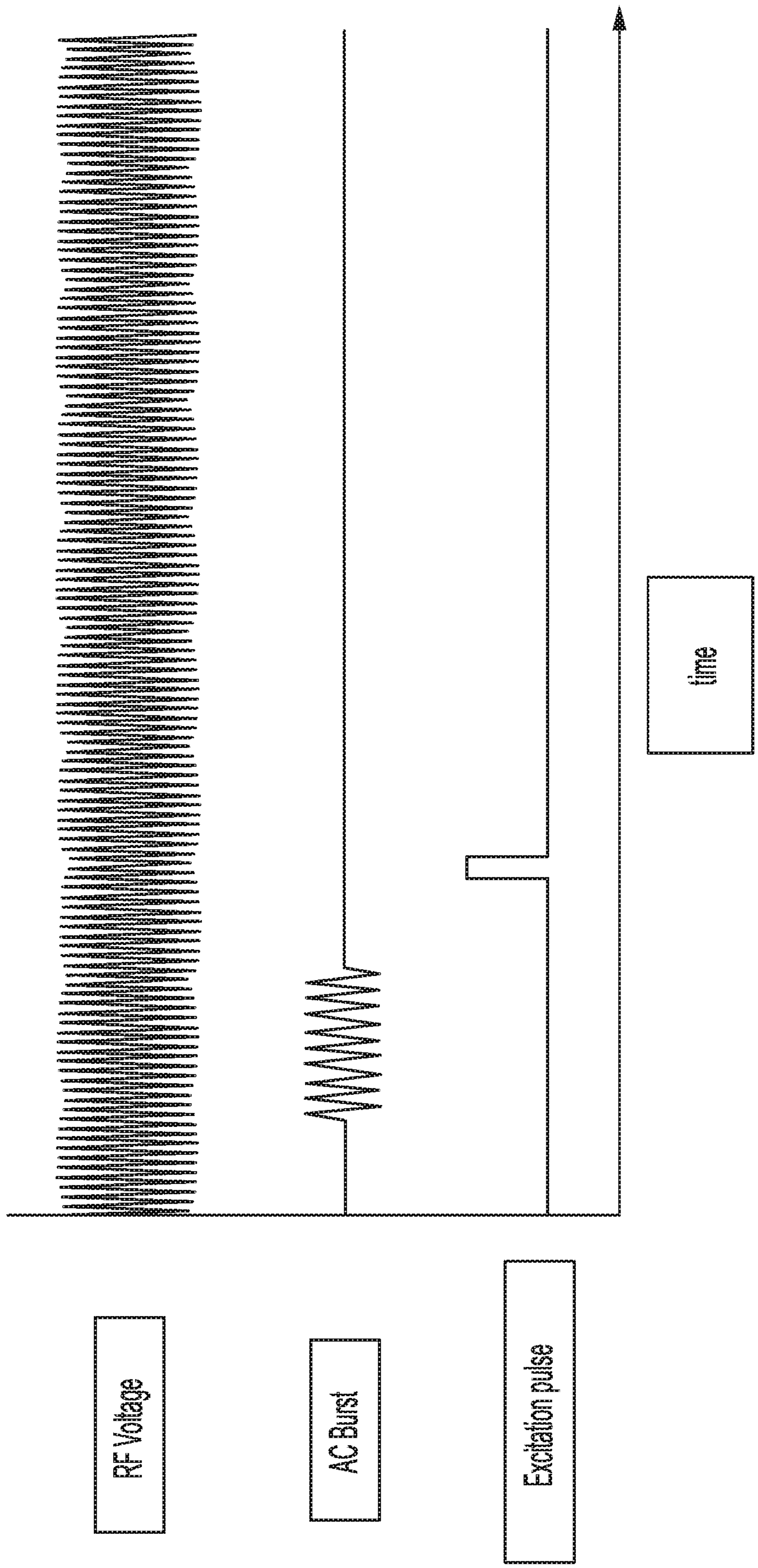
FIG. 10 shows the timing of various signals applied to the FT mass analyzer.

The above controller 1010 (See, FIG. 2A) can also be implemented in hardware, software and/or firmware using known techniques informed by the present teachings. For example, in one example of implementation of the controller 1010, similar to the implementation of the analyzer 1200 depicted in FIG. 4, the controller can include a processor, a random access memory (RAM), a permanent memory, a communications module and a bus for allowing the processor to communicate with the other components. In some embodiments, instructions for operating the FT mass analyzer according to the present teachings can be stored in the permanent memory and can be retrieved from the permanent memory and be transferred to the RAM during runtime for execution. By way of example, the instructions can implement a desired workflow, such as that depicted in FIG. 10. As shown in FIG. 10, in this embodiment, the controller 1010 can apply an RF voltage to at least one of the rods of the FT mass analyzer during the entire period of data acquisition in order to provide radial confinement of the ions. In this embodiment, the timing instructions stored in the controller are such that the application of the AC burst signal for removing certain ions precedes the application of the voltage pulse for causing radial excitation of the ions. As discussed above, in other embodiments, the voltage pulse can precede the AC burst signal, and yet in other embodiments, the AC burst signal and the voltage pulse can be applied substantially concurrently. In some embodiments, a mass analyzer according to the present teachings can include a quadrupole rod set as well as one or more auxiliary electrodes to which a voltage pulse can be applied for radial excitation of the ions within the quadrupole. By way of example, FIGS. 5A and 5B schematically depict a mass analyzer 2000 according to such an embodiment, which includes a quadrupole rod set 2020 composed of four rods 2020*a*, 2020*b*, 2020*c*, and 202*d* (herein collectively referred to as quadrupole rods 2020). In this embodiment, the analyzer 2000 further includes a plurality of auxiliary electrodes 2040*a*, 2040*b*, 2040*c* and 2040*d* (herein collectively referred to as auxiliary electrodes 2040), which are interspersed between the quadrupole rods 2020. Similar to the quadrupole rods 2020, the auxiliary electrodes 2040 extend from an input end (A) of the quadrupole to an output end (B) thereof. In this embodiment, the auxiliary electrodes 2040 have substantially similar lengths as the quadrupole rods 2020, though in other embodiments they can have different lengths.

Similar to the previous embodiment, RF voltages can be applied to the quadrupole rods 2020, e.g., via an RF voltage source (not shown) for radial confinement of the ions passing therethrough. Rather than applying a voltage pulse to one or more of the quadrupole rods, in this embodiment, a voltage pulse can be applied to one or more of the auxiliary electrodes to cause radial excitation of at least some of the ions passing through the quadrupole. By way of example, in this embodiment, a pulsed voltage source 2060 can apply a dipolar voltage pulse to the rods 2040*a* and 2040*d* (e.g., a positive voltage to the rod 2040*a* and a negative voltage to the rod 2040*d*).

Similar to the previous embodiment, the voltage pulse can cause radial excitation of at least some of the ions passing through the quadrupole. As discussed above, the interaction of the radially excited ions with the fringing fields in proximity of the output end of the quadrupole can convert the radial oscillations to axial oscillations, and the axially oscillating ions can be detected by a detector (not shown in this figure). Similar to the previous embodiment, an analyzer, such as the analyzer 1200 discussed above, can operate on a time-varying ion signal generated as a result of the detection of the axially oscillating ions to generate a frequency domain signal and can operate on the frequency domain signal to generate a mass spectrum of the detected ions.

Figure 6:
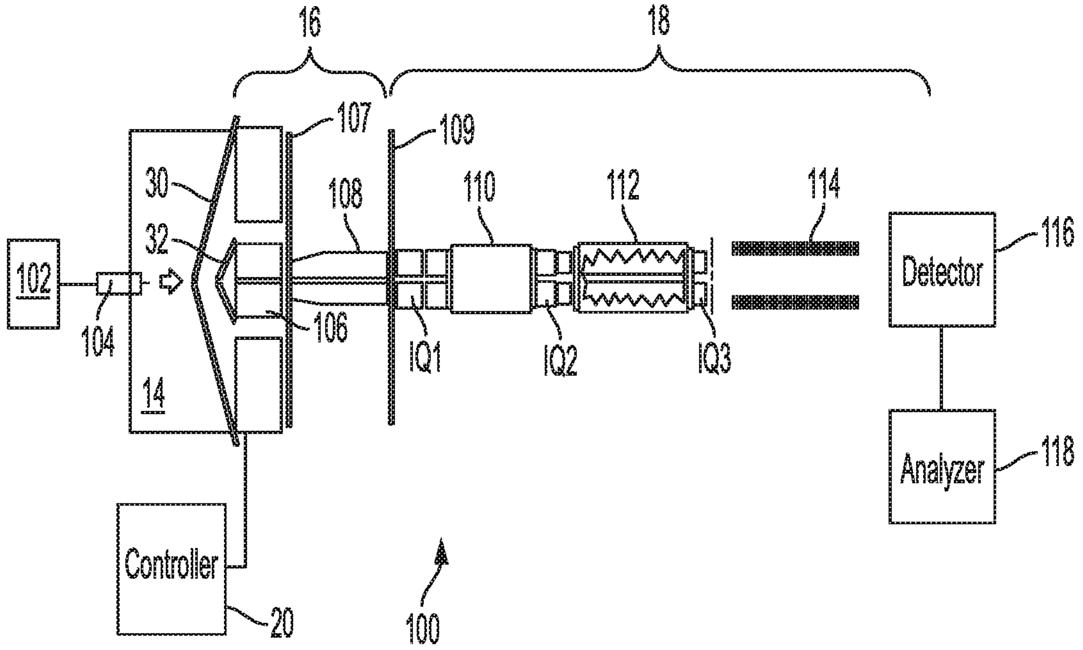
FIG. 6 is a schematic view of a mass spectrometer in which a mass analyzer according to the present teachings is incorporated.

A mass analyzer according to the present teachings can be incorporated in a variety of different mass spectrometers. By way of example, FIG. 6 schematically depicts such a mass spectrometer 100, which comprises an ion source 104 for generating ions within an ionization chamber 14, an upstream section 16 for initial processing of ions received therefrom, and a downstream section 18 containing one or more mass analyzers, collision cell and a mass analyzer 116 according to the present teachings.

Ions generated by the ion source 104 can be successively transmitted through the elements of the upstream section 16 (e.g., curtain plate 30, orifice plate 32, QJet 106, and Q0 108) to result in a narrow and highly focused ion beam (e.g., in the z-direction along the central longitudinal axis) for further mass analysis within the high vacuum downstream portion 18. In the depicted embodiment, the ionization chamber 14 can be maintained at an atmospheric pressure, though in some embodiments, the ionization chamber 14 can be evacuated to a pressure lower than atmospheric pressure. The curtain chamber (i.e., the space between curtain plate 30 and orifice plate 32) can also be maintained at an elevated pressure (e.g., about atmospheric pressure, a pressure greater than the upstream section 16), while the upstream section 16, and downstream section 18 can be maintained at one or more selected pressures (e.g., the same or different sub-atmospheric pressures, a pressure lower than the ionization chamber) by evacuation through one or more vacuum pump ports (not shown). The upstream section 16 of the mass spectrometer system 100 is typically maintained at one or more elevated pressures relative to the various pressure regions of the downstream section 18, which typically operate at reduced pressures so as to promote tight focusing and control of ion movement.

The ionization chamber 14, within which analytes contained within the fluid sample discharged from the ion source 104 can be ionized, is separated from a gas curtain chamber by a curtain plate 30 defining a curtain plate aperture in fluid communication with the upstream section via the sampling orifice of an orifice plate 32. In accordance with various aspects of the present teachings, a curtain gas supply can provide a curtain gas flow (e.g., of $N_2$) between the curtain plate 30 and orifice plate 32 to aid in keeping the downstream section of the mass spectrometer system clean by declustering and evacuating large neutral particles. By way of example, a portion of the curtain gas can flow out of the curtain plate aperture into the ionization chamber 14, thereby preventing the entry of droplets through the curtain plate aperture.

As discussed in detail below, the mass spectrometer system 100 also includes a power supply and controller (not shown) that can be coupled to the various components so as to operate the mass spectrometer system 100 in accordance with various aspects of the present teachings.

As shown, the depicted system 100 includes a sample source 102 configured to provide a fluid sample to the ion source 104. The sample source 102 can be any suitable sample inlet system known to one of skill in the art and can be configured to contain and/or introduce a sample (e.g., a liquid sample containing or suspected of containing an analyte of interest) to the ion source 104. The sample source 102 can be fluidly coupled to the ion source so as to transmit a liquid sample to the ion source 102 (e.g., through one or more conduits, channels, tubing, pipes, capillary tubes, etc.) from a reservoir of the sample to be analyzed, from an in-line liquid chromatography (LC) column, from a capillary electrophoresis (CE) instrument, or an input port through which the sample can be injected, all by way of non-limiting examples. In some aspects, the sample source 102 can comprise an infusion pump (e.g., a syringe or LC pump) for continuously flowing a liquid carrier to the ion source 104, while a plug of sample can be intermittently injected into the liquid carrier.

The ion source 104 can have a variety of configurations but is generally configured to generate ions from analytes contained within a sample (e.g., a fluid sample that is received from the sample source 102). In this embodiment, the ion source 104 comprises an electrospray electrode, which can comprise a capillary fluidly coupled to the sample source 102 and which terminates in an outlet end that at least partially extends into the ionization chamber 14 to discharge the liquid sample therein. As will be appreciated by a person skilled in the art in light of the present teachings, the outlet end of the electrospray electrode can atomize, aerosolize, nebulize, or otherwise discharge (e.g., spray with a nozzle) the liquid sample into the ionization chamber 14 to form a sample plume comprising a plurality of micro-droplets generally directed toward (e.g., in the vicinity of) the curtain plate aperture. As is known in the art, analytes contained within the micro-droplets can be ionized (i.e., charged) by the ion source 104, for example, as the sample plume is generated. In some aspects, the outlet end of the electrospray electrode can be made of a conductive material and electrically coupled to a power supply (e.g., voltage source) operatively coupled to the controller 20 such that as fluid within the micro-droplets contained within the sample plume evaporate during desolvation in the ionization chamber 12, bare charged analyte ions or solvated ions are released and drawn toward and through the curtain plate aperture. In some alternative aspects, the discharge end of the sprayer can be non-conductive and spray charging can occur through a conductive union or junction to apply high voltage to the liquid stream (e.g., upstream of the capillary). Though the ion source 104 is generally described herein as an electrospray electrode, it should be appreciated that any number of different ionization techniques known in the art for ionizing analytes within a sample and modified in accordance with the present teachings can be utilized as the ion source 104. By way of non-limiting example, the ion source 104 can be an electrospray ionization device, a nebulizer assisted electrospray device, a chemical ionization device, a nebulizer assisted atomization device, a matrix-assisted laser desorption/ionization (MALDI) ion source, a photoionization device, a laser ionization device, a thermospray ionization device, an inductively coupled plasma (ICP) ion source, a sonic spray ionization device, a glow discharge ion source, and an electron impact ion source, DESI, among others. It will be appreciated that the ion source 102 can be disposed orthogonally relative to the curtain plate aperture and the ion path axis such that the plume discharged from the ion source 104 is also generally directed across the face of the curtain plate aperture such that liquid droplets and/or large neutral molecules that are not drawn into the curtain chamber can be removed from the ionization chamber 14 so as to prevent accumulation and/or recirculation of the potential contaminants within the ionization chamber. In various aspects, a nebulizer gas can also be provided (e.g., about the discharge end of the ion source 102) to prevent the accumulation of droplets on the sprayer tip and/or direct the sample plume in the direction of the curtain plate aperture.

In some embodiments, upon passing through the orifice plate 32, the ions can traverse one or more additional vacuum chambers and/or quadrupoles (e.g., a QJet® quadrupole) to provide additional focusing of and finer control over the ion beam using a combination of gas dynamics and radio frequency fields prior to being transmitted into the downstream high-vacuum section 18. In accordance with various aspects of the present teachings, it will also be appreciated that the exemplary ion guides described herein can be disposed in a variety of front-end locations of mass spectrometer systems. By way of non-limiting example, the ion guide 108 can serve in the conventional role of a QJet® ion guide (e.g., operated at a pressure of about 1-10 Torr), as a conventional Q0 focusing ion guide (e.g., operated at a pressure of about 3-15 mTorr) preceded by a QJet® ion guide, as a combined Q0 focusing ion guide and QJet® ion guide (e.g., operated at a pressure of about 3-15 mTorr), or as an intermediate device between a QJet® ion guide and Q0 (e.g., operated at a pressure in the 100s of mTorrs, at a pressure between a typical QJet® ion guide and a typical Q0 focusing ion guide).

As shown, the upstream section 16 of system 100 is separated from the curtain chamber via orifice plate 32 and generally comprises a first RF ion guide 106 (e.g., QJet® of SCIEX) and a second RF guide 108 (e.g., Q0). In some exemplary aspects, the first RF ion guide 106 can be used to capture and focus ions using a combination of gas dynamics and radio frequency fields. By way of example, ions can be transmitted through the sampling orifice, where a vacuum expansion occurs as a result of the pressure differential between the chambers on either side of the orifice plate 32. By way of non-limiting example, the pressure in the region of the first RF ion guide can be maintained at about 2.5 Torr pressure. The QJet 106 transfers ions received thereby to subsequent ion optics such as the Q0 RF ion guide 108 through the ion lens IQ0 107 disposed therebetween. The Q0 RF ion guide 108 transports ions through an intermediate pressure region (e.g., in a range of about 1 mTorr to about 10 mTorr) and delivers ions through the IQ1 lens 109 to the downstream section 18 of system 100.

The downstream section 18 of system 100 generally comprises a high vacuum chamber containing the one or more mass analyzers for further processing of the ions transmitted from the upstream section 16. As shown in FIG. 5, the exemplary downstream section 18 includes a mass analyzer 110 (e.g., elongated rod set Q1) and a second elongated rod set 112 (e.g., q2) that can be operated as a collision cell. The downstream section further includes a mass analyzer 114 according to the present teachings.

Mass analyzer 110 and collision cell 112 are separated by orifice plates IQ2, and collision cell 112 and the mass analyzer 114 are separated by orifice plate IQ3. For example, after being transmitted from 108 Q0 through the exit aperture of the lens 109 IQ1, ions can enter the adjacent quadrupole rod set 110 (Q1), which can be situated in a vacuum chamber that can be evacuated to a pressure that can be maintained at a value lower than that of chamber in which RF ion guide 107 is disposed.

By way of non-limiting example, the vacuum chamber containing Q1 can be maintained at a pressure less than about $1\times10^{4}$ Torr (e.g., about $5\times10^{-5}$ Torr), though other pressures can be used for this or for other purposes. As will be appreciated by a person of skill in the art, the quadrupole rod set Q1 can be operated as a conventional transmission RF/DC quadrupole mass filter that can be operated to select an ion of interest and/or a range of ions of interest. By way of example, the quadrupole rod set Q1 can be provided with RF/DC voltages suitable for operation in a mass-resolving mode. As should be appreciated, taking the physical and electrical properties of Q1 into account, parameters for an applied RF and DC voltage can be selected so that Q1 establishes a transmission window of chosen m/z ratios, such that these ions can traverse Q1 largely unperturbed. Ions having m/z ratios falling outside the window, however, do not attain stable trajectories within the quadrupole and can be prevented from traversing the quadrupole rod set Q1. It should be appreciated that this mode of operation is but one possible mode of operation for Q1.

Ions passing through the quadrupole rod set Q1 can pass through the lens IQ2 and into the adjacent quadrupole rod set q2, which can be disposed in a pressurized compartment and can be configured to operate as a collision cell at a pressure approximately in the range of from about 1 mTorr to about 10 mTorr, though other pressures can be used for this or for other purposes. A suitable collision gas (e.g., nitrogen, argon, helium, etc.) can be provided by way of a gas inlet (not shown) to thermalize and/or fragment ions in the ion beam.

In this embodiment, the ions exiting the collision cell 112 can be received by the mass analyzer 114 according to the present teachings. As discussed above, the mass analyzer 114 can be implemented as a quadrupole mass analyzer with or without auxiliary electrodes. The application of RF voltages to the quadrupole rods (with or without a selectable resolving DC voltage) can provide radial confinement of the ions as they pass through the quadrupole and the application of a DC voltage pulse to one or more of the RF rods or the auxiliary electrodes can cause radial excitation of at least a portion (and preferably all) of the ions. As discussed above, the interaction of the radially excited ions with the fringing fields as they exit the quadrupole can convert the radial excitation of at least some of the ions into axial excitation. The ions are then detected by a detector 118, which generates a time-varying ion signal. An analyzer 120 in communication with the detector 118 can operate on the time-varying ion signal to derive a mass spectrum of the detected ions in a manner discussed above.

The following examples are provided for further elucidation of various aspects of the present teachings, and are not intended to necessarily provide the optimal ways of practicing the present teachings or the optimal results that can be obtained. The Examples show that the use of an AC burst signal to remove certain ions from the FT mass analyzer can advantageously improve the signal-to-noise ratio associated with a resultant mass spectrum of the remaining ions.

EXAMPLES

Example 1

Figure 7:
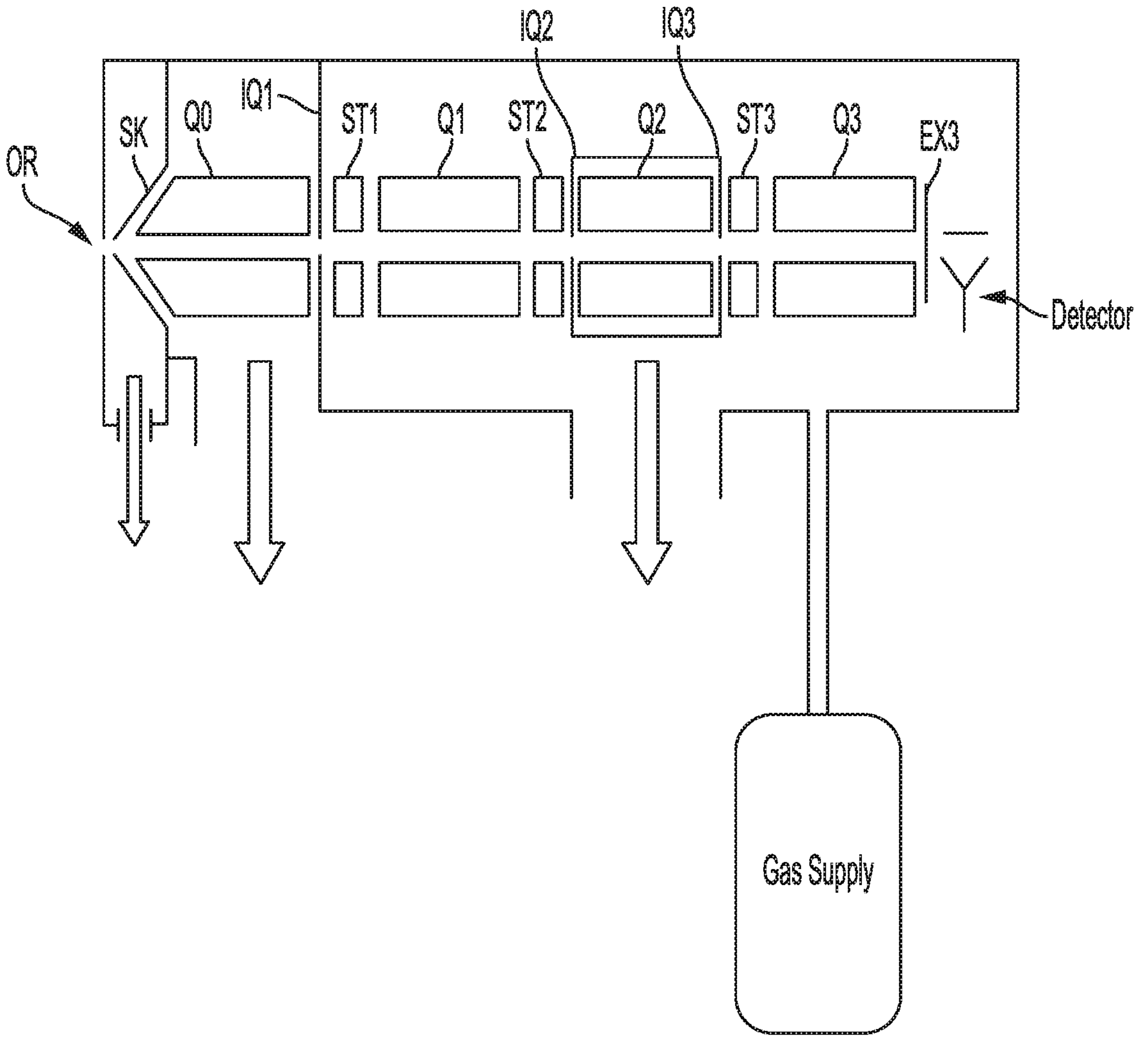
FIG. 7 is a schematic of an apparatus used to acquire illustrative data.

A mass spectrometer similar to the above mass spectrometer depicted in above FIG. 7 having an FT mass analyzer according to the present teachings, which includes an AC voltage source for the application of an AC burst signal to at least one of the rods of a quadrupole rod set of the FT mass analyzer was employed to obtain a mass spectrum of X500R positive ion calibration solution with and without application of an AC burst signal. Mass-dependent extraction was employed to extract the ions from the FT mass analyzer to be detected by a downstream detector in a manner disclosed herein.

Figure 8A:
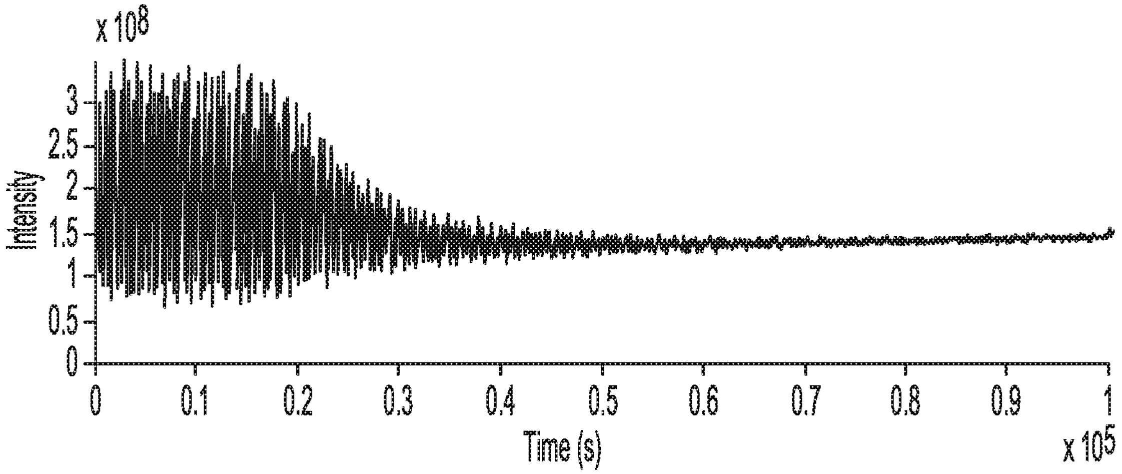
FIG. 8A shows an oscillatory ion signal detected from a blt positive ion solution.
Figure 8B:
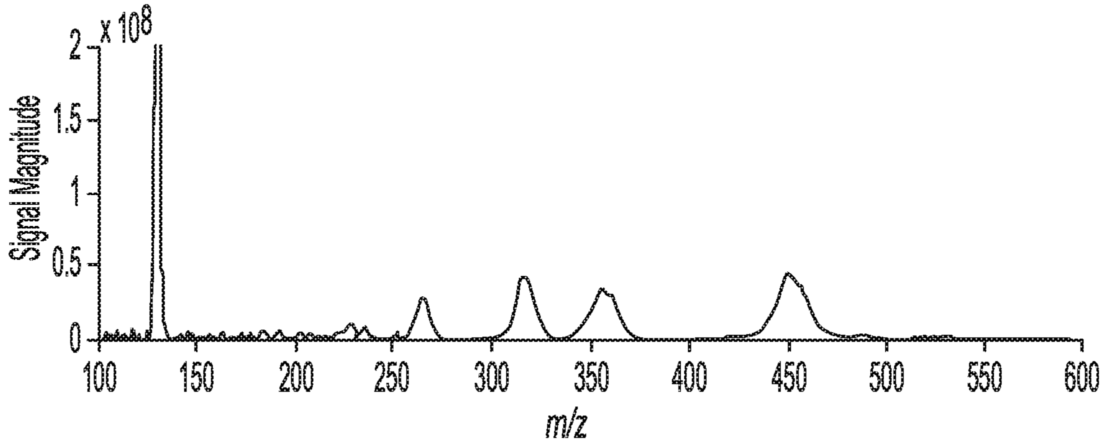
FIG. 8B shows a mass spectrum derived from the oscillatory ion signal.
Figure 8C:
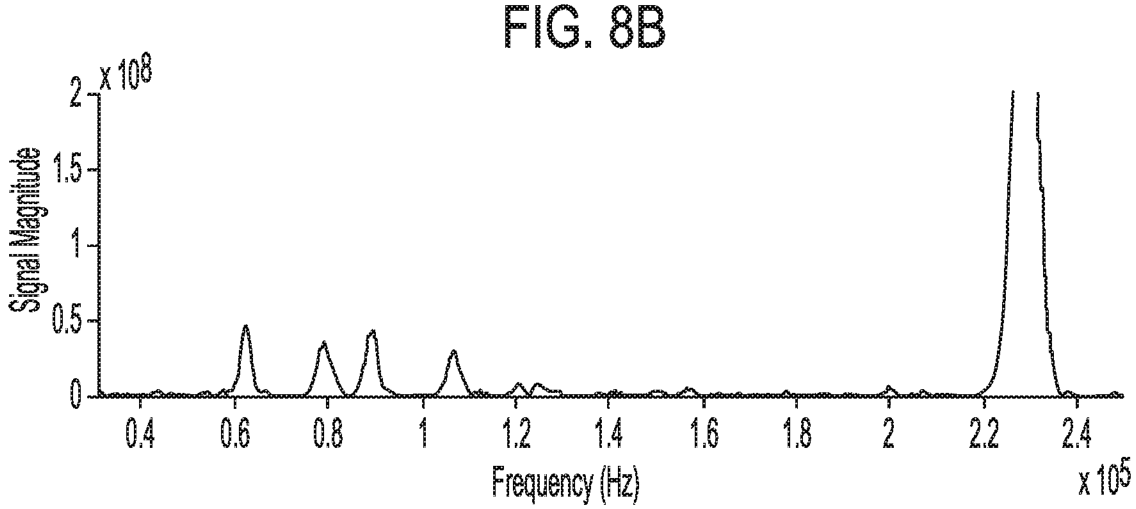
FIG. 8C shows the Fourier transform of the oscillatory ion signal depicted in FIG. 8A based on which the mass spectrum shown in FIG. 8B is derived.

FIG. 8A shows an oscillatory ion signal detected from the X500R positive ion solution (Sciex Part number: 5042912). FIG. 8C shows the Fourier transform of the oscillatory ion signal shown in FIG. 8A. And FIG. 8B shows the resultant mass spectrum derived from the FT signal depicted in FIG. 8C.

Example 2

In this example, the mass spectrometer was used to obtain a mass spectrum of an X500R positive ion calibration solution, but with the addition of an AC burst signal as disclosed herein in order to remove at least a portion of ions that would otherwise generate interfering oscillatory signals.

More specifically, in this embodiment, the short AC burst signal includes 10 oscillation cycles at a frequency of 227.4 kHz to remove nominal 132 m/z mass signal.

Figure 9A:
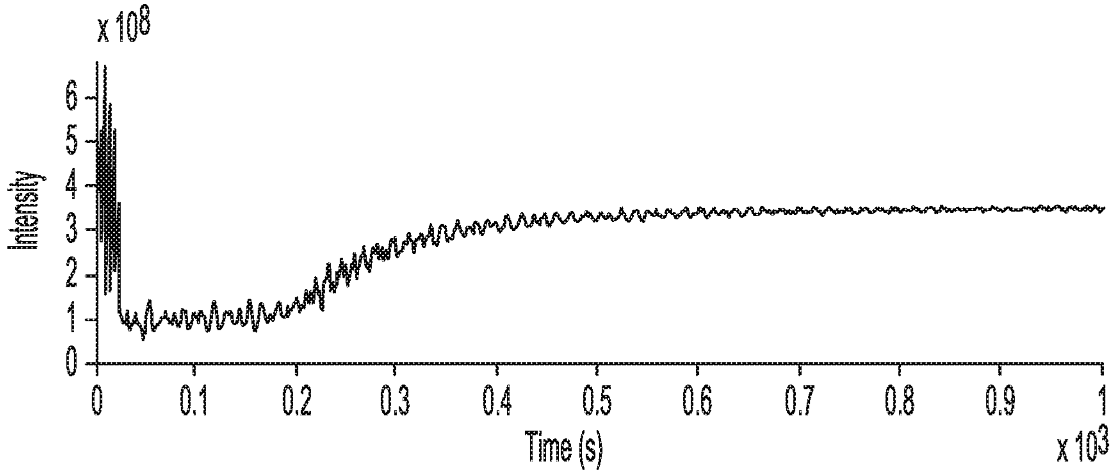
FIG. 9A is an oscillatory signal obtained from a blt positive ion solution after its passage through an FT mass analyzer according to the present teachings in which a burst of an AC signal was employed to remove certain ions to improve the signal-to-noise ratio of the resultant mass spectrum.
Figure 9B:
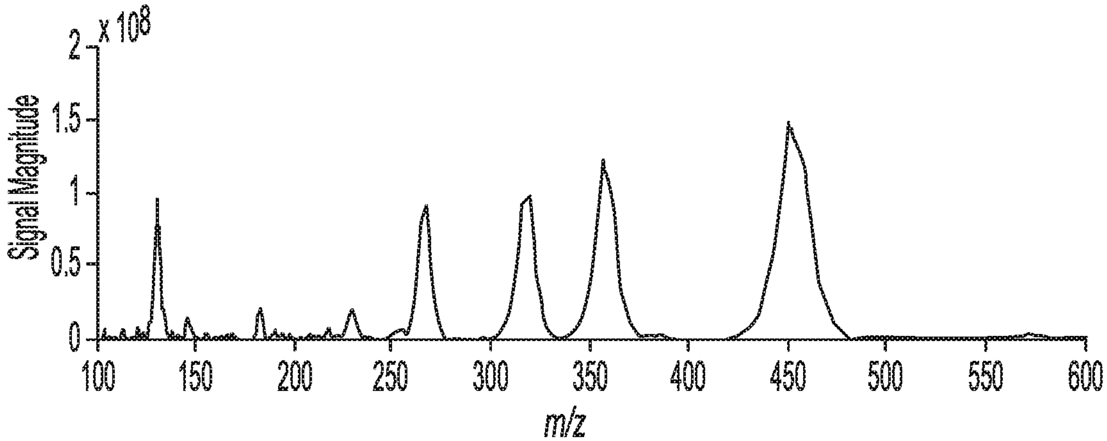
FIG. 9B is the resultant mass spectrum derived based on a Fourier transform of the oscillatory signal depicted in FIG. 9A, exhibiting enhanced SNR relative to the mass spectrum depicted in FIG. 8B.

The resultant oscillatory signal is depicted in FIG. 9A and the corresponding mass spectrum is shown in FIG. 9B. The mass spectrum depicted in FIG. 9B exhibits enhanced signal-to-noise ratio (SNR) for the mass peaks corresponding to ions having an m/z greater than 132.

Those having ordinary skill in the art will appreciate that various changes can be made to the above embodiments without departing from the scope of the invention.

What is claimed is:

1. A method of performing Fourier transform mass spectrometry, comprising:

passing a plurality of ions through a Fourier Transform (FT) mass analyzer comprising a plurality of rods arranged in a multipole configuration and providing a passageway through which ions can pass, said plurality of rods comprising an input port for receiving ions into said passageway and an output port through which ions can exit the passageway, applying at least one RF voltage to at least one of said rods so as to generate an RF field for radial confinement of the ions as they pass through the passageway, applying a resonant burst of an AC signal to at least one of said rods so as to remove ions having m/z ratios within a desired range from the ions introduced into the FT mass analyzer, wherein a number of oscillation cycles in said AC signal is in a range of about 2 to about 50, exciting radial oscillations of at least a portion of the remaining ions at secular frequencies thereof such that fringing fields in proximity of the output end of said plurality of rods convert said radial oscillations of at least a portion of said excited ions into axial oscillations as said excited ions exit the quadrupole rod set, and detecting at least a portion of said axially oscillating ions exiting the passageway to generate a time-varying signal.

2. The method of claim 1, further comprising obtaining a Fourier Transform of said time-varying signal so as to generate a frequency-domain signal and utilizing said frequency-domain signal to generate a mass spectrum associated with the detected ions.

3. The method of claim 1, wherein said AC signal has an amplitude in a range of about 1 volt to about 50 volts.

4. The method of claim 1, wherein said AC signal has a frequency in a range of about 50 kHz to about 600 kHz.

5. The method of claim 1, wherein said step of exciting the radial oscillations of at least a portion of the remaining ions comprises applying a voltage pulse across at least one pair of said plurality of rods.

6. The method of claim 5, wherein said voltage pulse has a duration in a range of about 0.1 microsecond to about 10 microseconds.

7. The method of claim 6, wherein said voltage pulse has an amplitude in a range of about 10 volts to about 60 volts.

8. The method of claim 1, wherein a temporal separation between said burst of the AC signal and said voltage pulse is less than about 50 microseconds.

9. The method of claim 1, wherein said RF voltage has a peak-to-peak amplitude in a range of about 10 volts to about 1000 volts.

10. The method of claim 1, wherein said RF voltage has a frequency in a range of about 50 kHz to about 3 MHz.

11. A Fourier Transform (FT) mass analyzer, comprising:

a multipole rod set comprising a plurality of rods arranged relative to one another to allow passage of ions therebetween, said multipole rod set comprising an input port for receiving ions and an output port through which ions can exit the multipole rod set, an RF voltage source for applying an RF voltage to at least of one said rods for causing radial confinement of the ions as they propagate through the multipole rod set, at least one AC voltage source for applying a resonant burst of an AC signal to at least one of said rods so as to remove ions having m/z ratios within a desired range from the ions introduced into the FT mass analyzer, wherein a number of oscillations in said AC resonant signal is in a range of about 2 to about 50, at least one voltage source for applying a voltage pulse to at least one of said rods so as to excite radial oscillations of at least a portion of the remaining ions at secular frequencies thereof such that fringing fields in proximity of the output port of the multipole rod set convert the radial oscillations of at least a portion of the excited ions into axial oscillations as the excited ions exit the multipole rod set, and a detector disposed downstream of said FT mass analyzer for detecting said axially oscillating ions exiting the multipole rod set.

12. The FT mass analyzer of claim 11, wherein said multipole rod set comprises a quadrupole rod set.

13. The FT mass analyzer of claim 11, wherein said detector generates a time-varying signal in response to detection of said axially oscillating ions.

14. The FT mass analyzer of claim 11, further comprising an analysis module for receiving said time-varying signal and applying a Fourier Transform to said time-varying signal so as to generate a frequency domain signal.

15. The FT mass analyzer of claim 14, wherein said analysis module operates on said frequency domain signal to generate a mass spectrum of the detected ions.

16. The FT mass analyzer of claim 11, wherein said AC resonant signal exhibits an amplitude in a range of about 1 volt to about 50 volts.

17. The FT mass analyzer of claim 11, wherein said voltage pulse has a duration in a range of about 100 ns to about 100 microseconds.

18. The FT mass analyzer of claim 11, wherein said voltage pulse has an amplitude in a range of about 20 volts to about 60 volts.

* * * * *